Figure 4:
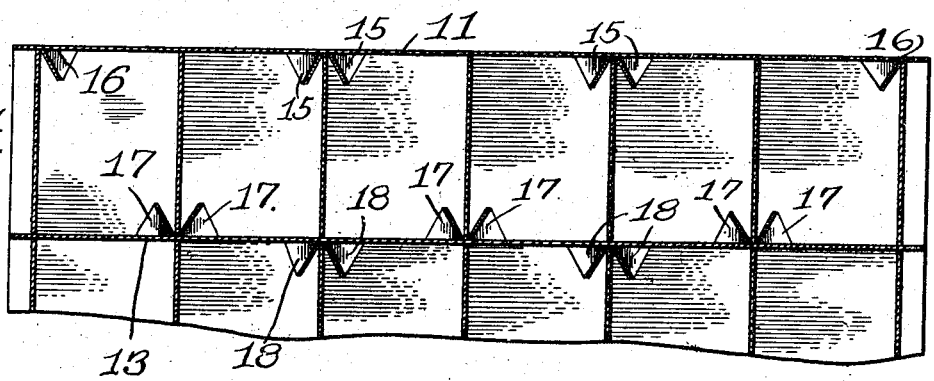

P. MANDEVILLE.
EGG CASE FILLER.
APPLICATION FILED DEC. 11, 1913.
1,184,192.
Patented May 23, 1916.
2 SHEETS—SHEET 1.
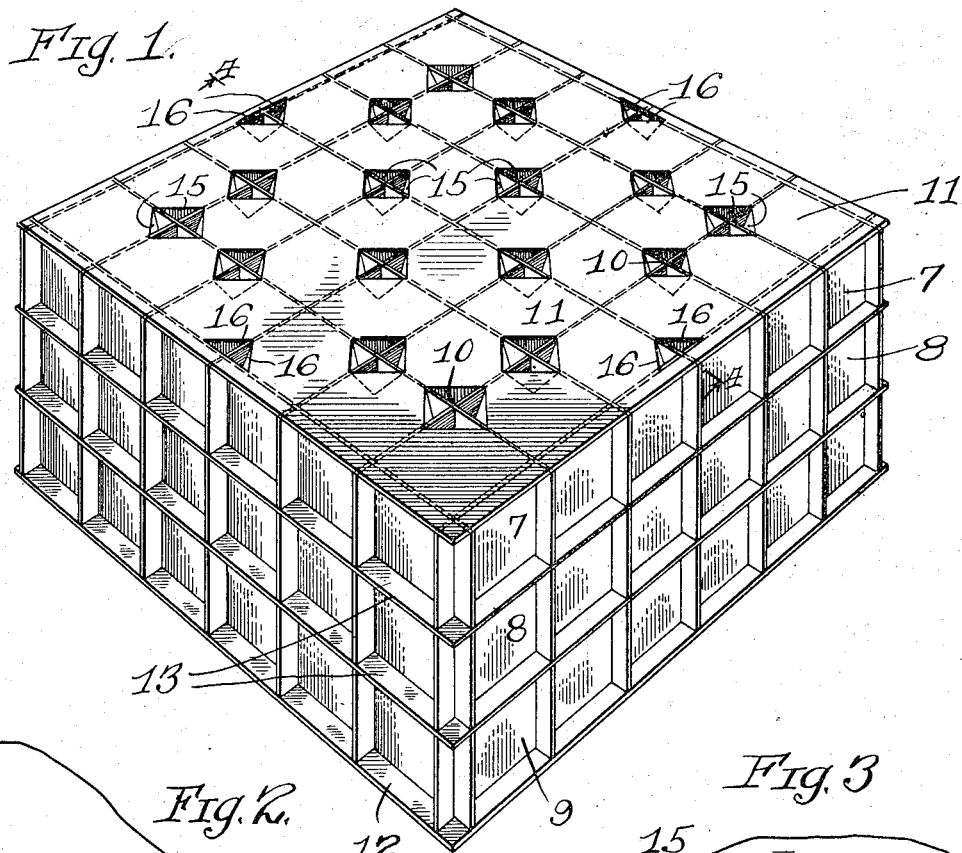
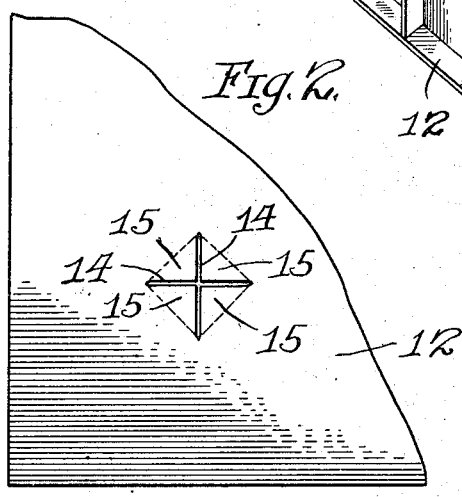
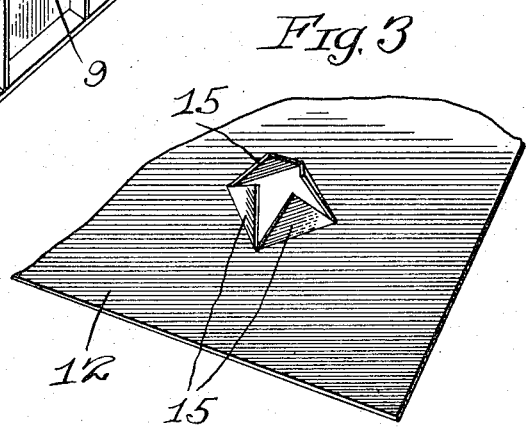
Witnesses:
L. B. Graham
Inventor:
Paul Mandeville,
Adams & Jackson,
By his Atty's.

UNITED STATES PATENT OFFICE.

PAUL MANDEVILLE, OF LAKE BLUFF, ILLINOIS, ASSIGNOR TO THE PAUL MANDEVILLE COMPANY, OF CHICAGO, ILLINOIS, A CORPORATION OF ILLINOIS.

EGG-CASE FILLER.

1,184,192.

Specification of Letters Patent.  Patented May 23, 1916.

Application filed December 11, 1913. Serial No. 805,920.

*To all whom it may concern:*

Be it known that I, PAUL MANDEVILLE, a citizen of the United States, residing at Lake Bluff, in the county of Lake and State of Illinois, have invented certain new and useful Improvements in Egg-Case Fillers, of which the following is a specification, reference being had to the accompanying drawings.

My invention relates to fillers for egg cases of the well-known type in which each unit is composed of a number of narrow strips of strawboard, or similar material, assembled to form a reticulated frame having rectangular spaces or compartments for individual eggs. The several strips are interlocked, and when not in use are collapsible, but when opened to receive the eggs one series of parallel strips assume a position at right angles to another series of parallel strips, so that the egg compartments are rectangular in form. Usually such units are arranged to form thirty-six compartments. These fillers, when placed in an egg case, which is usually of wood, are disposed one on top of another with separating strawboard plates, technically termed "flats", between successive units, and also at the top and bottom of the filler as a whole, so that the eggs are not only separated from each other by the strawboard strips forming the separate units, but also by the intervening flats. They are protected by the top and bottom flats. In the use of such egg case fillers, there is a considerable loss by breakage of eggs, due to the accidental collapsing of the fillers, since the material of which they are made is so flimsy that it yields to lateral pressure comparatively easily, and in the handling of egg cases this frequently occurs.

The object of my invention is to improve the construction of such fillers by providing means for holding the strips forming the separate units more rigidly in their rectangular relation to each other, thus providing a much more secure container for the eggs; also to provide means for temporarily connecting together the several units assembled to make up the filler as a whole so as to make the assembled units more nearly integral with each other and thereby give to the assembled units a certain rigidity, which very materially increases the efficiency of the filler as an egg carrier.

A further object is to provide for ventilating the eggs while contained in the filler, which assists in their preservation.

I accomplish these objects as illustrated in the drawings and as hereinafter described.

What I regard as new is set forth in the claims.

Figure 5:
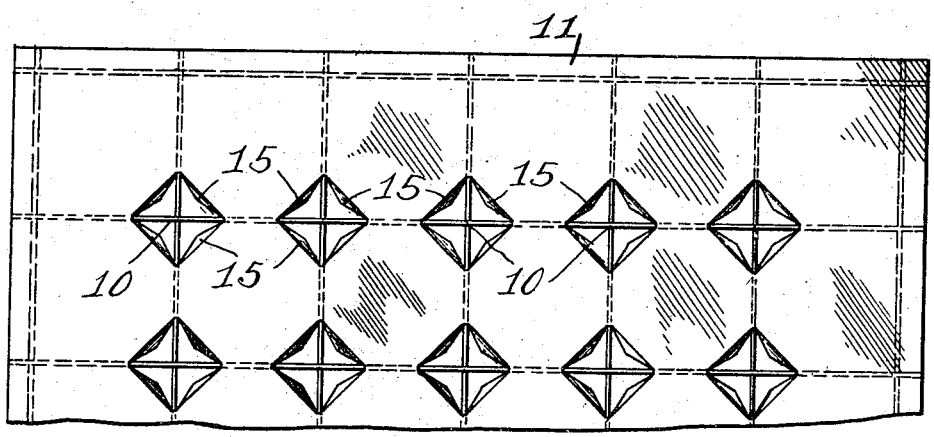

In the accompanying drawings,—Figure 1 is a perspective view of an egg case filler, comprising three filler units with top and bottom flats and two intermediate flats. It will be understood that in practice any desired number of units may be employed, the number shown in the illustration being, for convenience, reduced below that usually employed. Fig. 2 is a detail, being a plan view showing a part of one flat slit to provide four lips, which, when in use, are bent at an angle to the body of the flat, as illustrated in Fig. 3, which is a perspective view showing one corner portion of a flat. Fig. 4 is a partial vertical cross-section of the upper portion of a filler showing the uppermost unit and a part of the next lower unit with the flats in operative position; Fig. 5 is a partial plan view showing one of the top or bottom flats in position, the flat in this case having lips arranged to engage every intersection of the filler strips; and Fig. 6 is a similar view showing a top flat having lips which engage alternate intersections of the filler strips.

Referring to the drawings,—7—8—9 indicate filler units, each of which is composed of two series of parallel strips which intersect each other forming rectangular intersections 10 when in operative position, as shown in the drawings.

11 indicates a top flat, 12 a bottom flat and 13 intermediate flats, which are adapted to be assembled as shown in Fig. 1, the intermediate flats 13 separating the several units from each other, while the top and bottom flats, respectively, cover the top and bottom of the filler as a whole. As best shown in Figs. 2 and 3, the top and bottom flats are slit at a number of points with cross-shaped slits 14, to form lips 15, which are adapted to be turned at an angle to the surface of the flat, as shown in Fig. 3. These slits are so placed that the lips 15, when bent into operative position, fit between the four corners formed at each intersection of the filler strips, in the manner shown in Fig. 1, so that they operate to hold such intersecting strips in their rectangular position, thus making the unit rigid and preventing it from collapsing accidentally.

Figure 6:
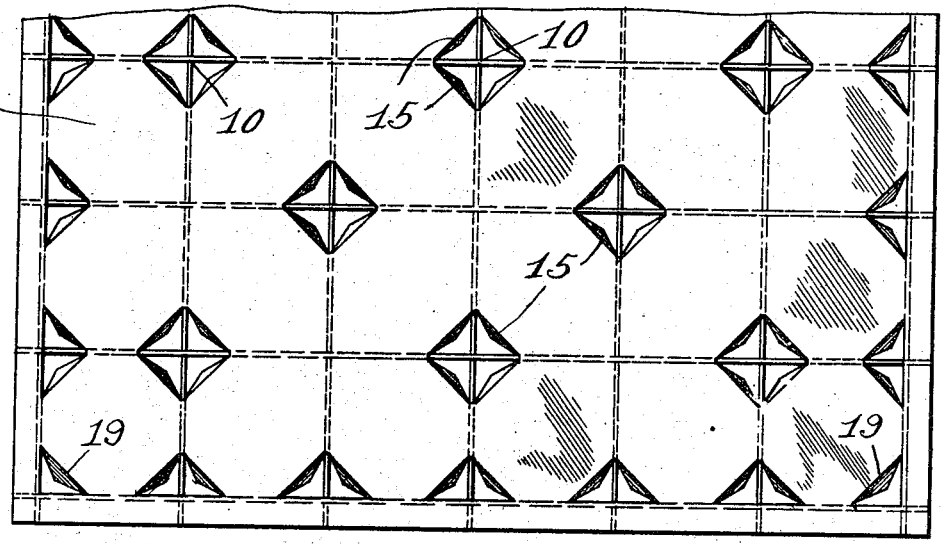

If desired, the top and bottom flats may be similar to each other, each being provided with locking lips which register with every intersection of the filler strips, as illustrated in Fig. 5, but if preferred, lips may be provided so as to register with alternate intersections, as shown in Fig. 6, in which case it is preferable to make the top and bottom flats so that their respective lips alternate in position. Where the flats are not provided with lips which engage the filler strips adjacent to every intersection thereof, it is desirable to provide a pair of lips 16 at the center of each side margin, as shown in Fig. 1, to add rigidity to the marginal portions of the unit, single separate slits being made at such points, as illustrated, instead of the cross-shaped slits shown in Fig. 2. These marginal lips may be provided at each intersection along the margins of the filler unit as shown in Fig. 6, and in addition, in order to strengthen the corners of the unit, lips 19 may be provided at the corners of the flats as shown in said figure. By extending the ends of the filler strips and making the flats correspondingly larger, four lips may be employed at each marginal intersection in the same way as at intermediate intersections, thus further strengthening the marginal portions of the units.

The intermediate flats 13 are similar to the top and bottom flats, except that they are provided with alternate upwardly and downwardly-projecting lips 17—18, so that such intermediate flats engage the units above them, as well as those below them. Thus they serve to inter-connect the several units making up the filler as a whole, and not only prevent the units from collapsing accidentally, but hold them in position with reference to each other. While it would be practicable, and advantageous as compared with the old style filler, to use two similar flats like the top and bottom flats, arranged back to back between successive units, instead of employing a single flat having the lips alternately projecting upward and downward, such construction would not possess the advantage of securing the several units together, and therefore I prefer to employ intermediate flats constructed as shown in Fig. 4. A further advantage of my improved construction is that the openings formed by the bending of the lips provide for the ventilation of the eggs throughout the entire filler as a whole, which is advantageous for the reason already mentioned.

While the embodiment of my invention as illustrated and described contemplates the making of the locking devices by slitting the flats to form lips, it will be obvious that equivalent locking devices may be made in various other ways, and the claims hereinafter made are, therefore, not to be restricted to the specific construction shown and described, except in so far as it is particularly claimed.

What I claim as my invention, and desire to secure by Letters Patent, is,—

1. The combination with an egg case filler unit composed of a plurality of sets of intersecting strips, of a flat having lips adapted to engage certain of said filler strips adjacent to intersections thereof to hold the same in operative position.

2. In combination with an egg-case filler unit composed of a plurality of sets of intersecting strips, of a flat having lips fitting in between the corners formed by the intersecting strips and adapted to engage the sides of said filler strips adjacent the intersections thereof to hold the filler strips in operative position.

3. The combination with an egg case filler of units, each of composed of a plurality of units, each of said units comprising a plurality of sets of intersecting strips, of a flat having upwardly and downwardly-projecting lips engaging the strips of the adjacent units for holding the same in position.

4. An egg case filler, comprising a plurality of units, each composed of sets of strips adapted to be disposed at right angles to each other, intermediate flats between successive units, said intermediate flats having upwardly and downwardly projecting lips engaging the strips of the adjacent units for holding them in operative relation to each other, and upper and lower flats at the top and bottom, respectively, of said filler, said upper flat having downwardly projecting lips engaging the strips of the top unit and said lower flat having upwardly projecting lips engaging the strips of the lower unit for holding them in position.

5. A flat for egg case fillers having intersecting strips, said flat having integral lips bent at an angle to the surface thereof and so formed and positioned as to fit in the corners formed at each intersection of the filler strips and adapted to engage the filler strips adjacent to the intersections thereof for holding the strips in position.

6. A flat for egg case fillers having intersecting filler strips, said flat having its surface slit in the form of a cross to form four converging lips, said lips being adapted to be bent at an angle to the surface of said flat and so positioned as to engage the filler strips adjacent to the intersections thereof for holding them in position.

7. The combination with an egg case filler unit composed of a plurality of intersecting strips, of a flat formed from a substantially flat sheet and having a substantially V-shaped lip projecting into the angle formed by the intersection of said strips, for maintaining the angular relation of said strips to each filler.

PAUL MANDEVILLE.

Witnesses:
 JOHN L. JACKSON,
 WILLIAM A. FURNNER.